United States Patent [19]

Malik

[11] 4,312,752
[45] Jan. 26, 1982

[54] AQUARIUM FILTER APPARATUS

[76] Inventor: Richard J. Malik, 2721 Morin Grove, Erie, Mich. 48133

[21] Appl. No.: 131,658

[22] Filed: Mar. 19, 1980

[51] Int. Cl.³ ............................................. E04H 3/20
[52] U.S. Cl. .................................... 210/169; 210/416.2
[58] Field of Search ............ 210/169, 416 AS; 119/3, 119/5

[56] References Cited
U.S. PATENT DOCUMENTS

| | | | |
|---|---|---|---|
| 2,676,921 | 4/1950 | Vansteenkiste | 210/169 |
| 2,769,779 | 11/1956 | Vansteenkiste et al. | 210/169 |
| 2,877,898 | 3/1959 | Lacey | 210/416 |
| 3,119,774 | 1/1964 | Arak | 210/169 |
| 3,321,081 | 5/1967 | Willinger | 210/169 |
| 3,324,829 | 6/1967 | José et al. | 210/169 |
| 3,511,376 | 5/1970 | Sesholtz | 210/169 |
| 3,516,543 | 6/1970 | Willinger | 210/169 |
| 3,738,494 | 6/1973 | Willinger et al. | 210/169 |
| 3,865,729 | 2/1975 | Baensch | 210/416 |
| 3,892,663 | 7/1975 | Wiedenmann | 210/416 |
| 4,035,298 | 7/1977 | Cloke et al. | 210/169 |
| 4,077,877 | 3/1978 | Orensten et al. | 210/169 |
| 4,123,359 | 10/1978 | Smith | 210/169 |
| 4,145,289 | 3/1979 | Scroussi | 210/416 |
| 4,206,054 | 6/1980 | Moore et al. | 210/169 |

*Primary Examiner*—Theodore A. Granger
*Attorney, Agent, or Firm*—Wilson, Fraser, Barker & Clemens

[57] ABSTRACT

A filter apparatus for an aquarium combines mechanical, chemical, and biological filters in a structure which can be hidden from view under the gravel at the bottom of the tank. A generally horizontally extending upper wall and attached supporting sides cooperate with the bottom of the tank to define a dispersion chamber. A filter box is supported above the upper wall and defines a filter cavity for retaining mechanical and chemical filter material with an inlet in fluid communication with a portion of the tank above the upper wall and an outlet in fluid communication with the dispersion chamber. The upper wall has a plurality of apertures formed therein for substantially uniform dispersion of water from the dispersion chamber. A pump means circulates water from the tank through the filter material in the filter box, through the dispersion chamber and back to the tank through the gravel. The flow of clean water out of the apertures in the upper wall and up through the gravel achieves biological filtration. The filter apparatus also includes a selectively adjustable bypass path for regulating the flow of water through the dispersion chamber.

9 Claims, 8 Drawing Figures

AQUARIUM FILTER APPARATUS

BACKGROUND OF THE INVENTION

1. Field of the Invention

The invention relates to a filter apparatus for mechanically, chemically, and biologically filtering the water in an aquarium.

2. Description of the Prior Art

Aquatic life in an aquarium produces waste products and contaminates such as fish feces, uneaten food, dead plant materials, etc. These waste products and contaminants are generally removed by filtration. The three basic types of filtration are mechanical, chemical, and biological.

Biological filtration is accomplished by aerobic bacteria living in the gravel or other substantial material at the bottom of the tank. If oxygenated water is circulated through the gravel, aerobic bacteria will be encouraged and convert the organic waste products into less harmful substances. Thus, the gravel bed will function as a biological filter for organic waste products.

Chemical filtration absorbs undesirable gases and other contaminants. Typically, activated carbon is utilized for absorption. Mechanical filtration traps suspended particles. Typically, a filter material such as filter floss is utilized.

There are many forms of prior art filters which are utilized in the standard aquarium and incorporate one, two or all three of the above-described filter types. However, these prior art filters have a common fault in that some portion extends over the top of the aquarium and into the viewing area. Thus, a housing, tube, or the like blocks and/or detracts from the view of the decor in the aquarium.

SUMMARY OF THE INVENTION

The present invention concerns a filter assembly for use in an aquarium tank. The assembly incorporates the use of mechanical, chemical, and biological filters in a structure which can be completely hidden from view under the gravel at the bottom of the tank. A generally horizontally extending upper wall has attached thereto downwardly extending supporting sides which space the upper wall from the bottom of the tank. The upper wall, sides and tank bottom define a dispersion chamber from which partially filtered water can be dispersed through a plurality of apertures formed in the upper wall.

A filter box is supported above the upper wall to define a filter cavity for retaining both mechanical and chemical filter material. The filter cavity has an inlet in fluid communication with a portion of the tank above the upper wall and an outlet in fluid communication with the dispersion chamber. A pump means circulates water from the portion of the aquarium above the filter through the filter apparatus by drawing the water into the fluid inlet and through the filter material in the filter cavity. The partially filtered water flows from the fluid outlet through the dispersion chamber and returns to the upper portion of the tank through the upper wall apertures and the gravel covering the filter apparatus. The flow of water through the gravel stimulates the growth of aerobic bacteria which function as a biological filter.

The apparatus also can have a bypass cavity having a selectively adjustable area outlet in fluid communication with the portion of the tank above the filter and an inlet in fluid communication with the filter cavity fluid outlet. When a constant flow pump is utilized, the bypass cavity can be utilized to reduce that portion of the total flow which flows through the dispersion chamber.

It is an object of the present invention to provide a filter apparatus for a standard glass aquarium which can be completely hidden from view.

It is another object of the present invention to provide a filter apparatus for an aquarium tank which combines mechanical, chemical, and biological filters.

It is a further object of the present invention to provide an aquarium filter assembly having a minimum number of parts for ease of manufacture and reduced cost.

It is another object of the present invention to provide an aquarium filter assembly having easy access for changing the chemical and mechanical filter materials.

DESCRIPTION OF THE PREFERRED EMBODIMENT

Figure 1:
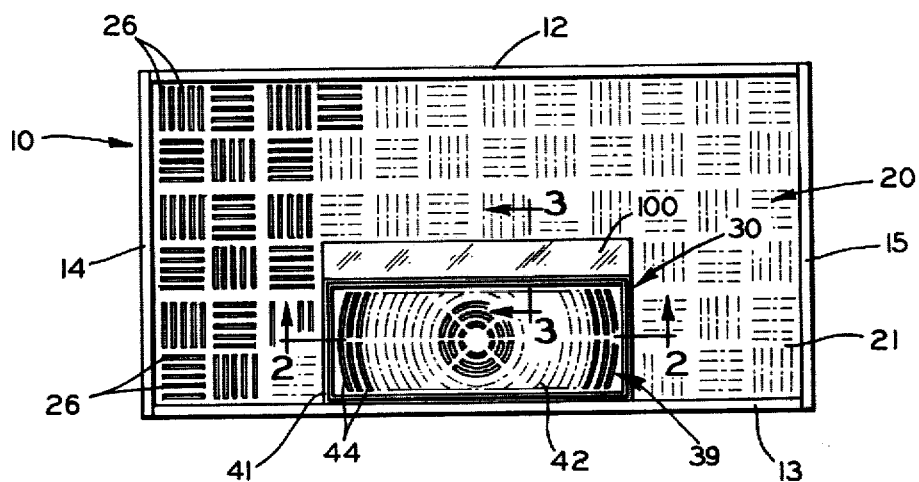
FIG. 1 is a top plan view of an aquarium tank containing an aquarium filter assembly according to the present invention.
Figure 2:
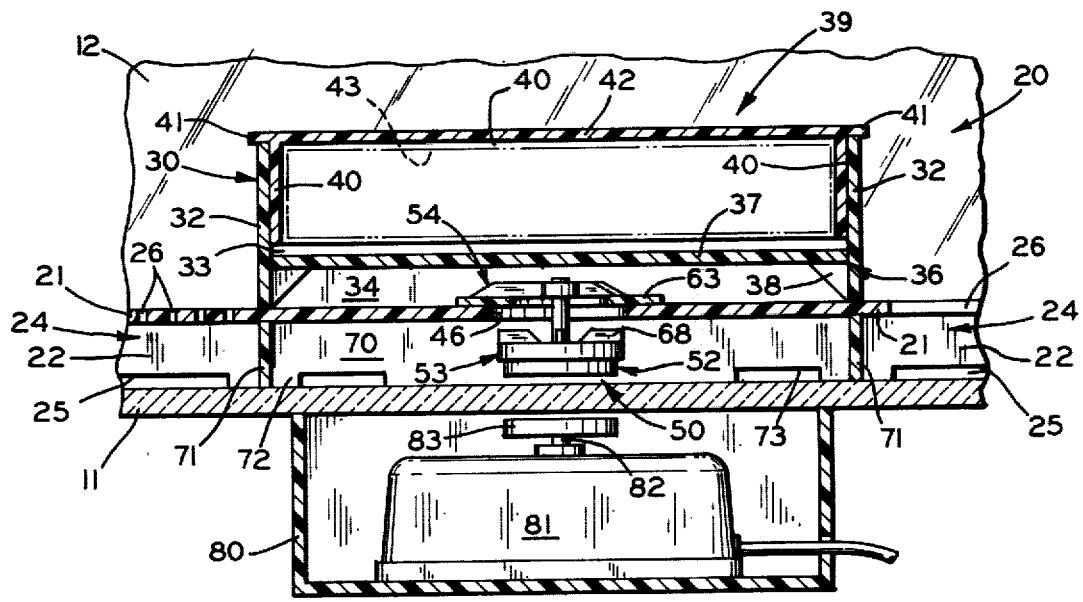
FIG. 2 is an enlarged cross sectional view of the filter assembly taken along line 2—2 of FIG. 1.
Figure 3:
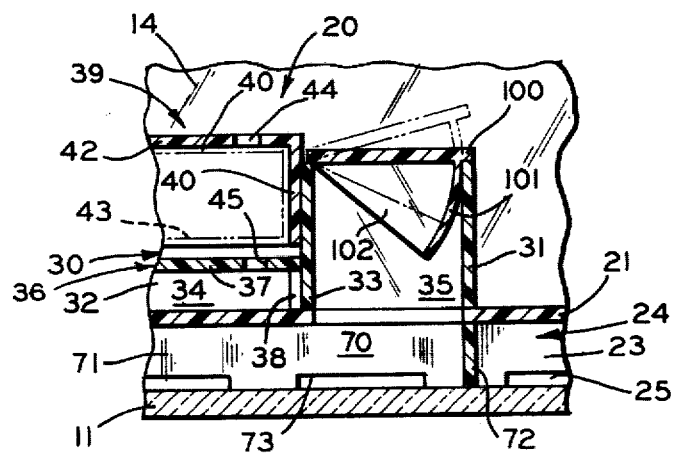
FIG. 3 is an enlarged cross sectional view of the filter assembly taken along the line 3—3 of FIG. 1.

FIG. 1 is a top plan view of an aquarium tank 10 containing an aquarium filter assembly 20 according to the present invention. FIGS. 2 and 3 are enlarged cross sectional views taken along the lines 2—2 and 3—3 respectively of FIG. 1. The tank 10 is formed from a bottom wall 11, a pair of upstanding side walls 12 and 13 and a pair of upstanding end walls 14 and 15. The abutting edges of the bottom and the side and end walls are sealed together to retain a quantity of water. Typically, the bottom 11 and the walls 12 through 15 are formed from transparent glass for the purpose of viewing both inanimate and live objects placed in the tank 10. The tank can be supported by a conventional stand which is commercially available. Typically, such a stand is formed as a metal frame which contacts the edges of the bottom 11 leaving the center of the bottom 11 and the walls 12 through 15 unobstructed.

The filter assembly 20 includes a substratum in the form of a horizontal perforated plate 21 for supporting gravel, spaced above the tank bottom 11 and extending between walls 12, 13, 14 and 15. The plate 21 is supported above the upper surface of the tank bottom 11 by support walls extending downwardly from the edges of the plate 21 adjacent the side and end walls of the tank 10. In FIG. 2 there is shown a support wall 22 which extends parallel and adjacent to the side wall 12. In FIG. 3, there is shown a support wall 23 which extends parallel and adjacent to the end wall 14. The perforated plate 21 and the support walls 22 and 23, the support walls (not shown) adjacent the walls 13 and 15, and the bottom of the tank form a dispersion chamber 24 from which filtered water is dispersed as described below.

The support walls 22 and 23 and the support walls which are not shown each have a plurality of horizontally extending slots 25 formed therein. Thus, water in the dispersion chamber 24 can flow through the slots 25 and up between the support sides and the tank to the upper portion of the tank 10. Also, the upper, wall 21 has a plurality of apertures formed therein for water flow from the dispersion chamber to the upper portion of the tank. As best shown in FIG. 1, the aperatures are formed as groups of parallel slots 26 in a checkerboard pattern. However, any suitable pattern and/or shape and/or size aperture could be utilized to obtain substantially uniform dispersion of water from the dispersion chamber without weakening the wall 21 which typically must support gravel and other objects (not shown) resting on the upper surface thereof. One limiting factor in the size of the apertures 26 is that the gravel must not be allowed to fall into the dispersion chamber.

Attached to the upper surface of the wall 21 is a generally rectangular filter box retainer 30 having a pair of upstanding side walls 31 (only one is shown) and a pair of upstanding end walls 32 which cooperate with the wall 21 to define a structure open at the top. An upstanding center wall 33 is formed parallel to the side walls 31 to divide the structure into a filter cavity 34 and a bypass cavity 35. A removable filter bottom cover 36 is positioned in the bottom of the filter cavity 34. The bottom cover 36 includes a horizontally extending support plate 37 the edges of which abut the inside surfaces of the walls forming the filter cavity 34. The plate 37 has a downwardly extending foot 38 formed at each corner thereof to space the plate above the upper surface of the upper wall 21. Alternatively, the bottom cover could be formed without the feet 38, the plate 37 snap fitting into or otherwise attached to the bottom of the filter box which is described below.

The open top of the filter cavity 34 receives a removable filter box 39. The box 39 is formed with four vertically extending sides 40 which abut the inside surfaces of the walls of the filter cavity 34 and extend above the upper ends of those walls. A horizontally extending flange 41 is formed on the outer surface of three of the walls 40 adjacent the upper ends thereof for supporting the box 39 on the upper ends of the filter box retainer walls 31 and 32. The flange 41 is not formed on the wall 40 abutting the central wall 33 to prevent interference with a bypass cavity cover as will be described below. A horizontally extending upper cover plate 42 is attached to the inner surfaces of the side walls 40 adjacent the upper edges thereof. The support plate 37, the side walls 40 and the cover plate 42 define an enclosure for filter material 43 shown in phantom. The cover plate 42 has a plurality of arcuate shaped slots 44 formed therein defining a plurality of concentric circles and portions thereof. The support plate 37 also has a plurality of such slots 45 formed therein. Thus, water can flow from the upper portion of the tank 10, through the plate 42, through the filter material 43 and out through the support plate 37.

Although shown in phantom in order to simplify the drawings, the filter material can take several forms. However, for maximum effectiveness, the filter should contain both a chemical filter and a mechanical filter. The chemical filter could be activated carbon granules enclosed in a nylon bag which would be positioned on the upper surface of the support plate 37. The mechanical filter could be a block of filtering floss cut to the dimensions of the space remaining between the bag and the bottom surface of the cover plate 42. Both of these filter materials are available commercially and are well known. As an alternative, a floss pad cut to the dimensions of the space between the support plate 37 and the cover plate 42 with the charcoal granules embedded therein could be utilized. The pad can be formed flat or as a long strip and folded alternately.

Figure 4:
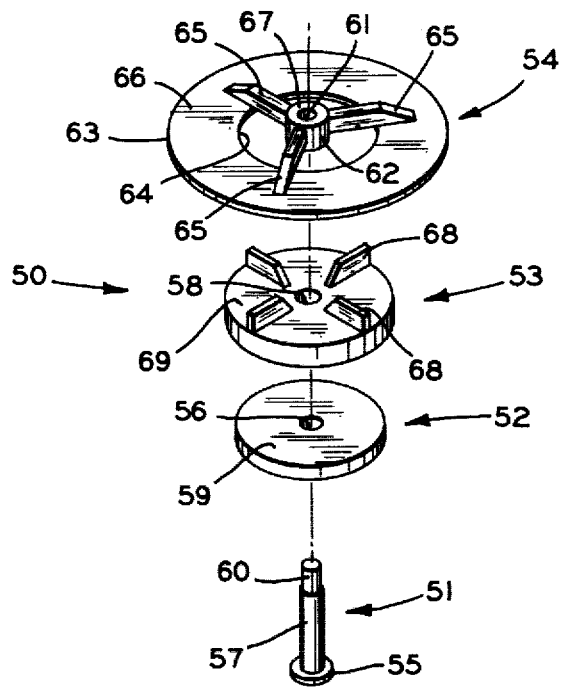
FIG. 4 is an enlarged, exploded, perspective view of the impeller shown in FIG. 2.

The upper wall 21 has a circular aperture 46 formed therein generally centered on the same axis as the center of the patterns of the slots 44 and 45. The remainder of the wall 21 defining the bottom of the filter cavity 34 is solid rather than slotted. The bottom of the filter cavity could also be formed as a separate element attached to the sides of the filter box retainer and the filter box retainer positioned in or over a large aperture in the upper wall 21. An impeller assembly 50 is shown in FIG. 2 and in an enlarged, exploded perspective view in FIG. 4. The assembly 50 includes an impeller shaft 51 which extends through central apertures formed in a disk magnet 52, an impeller disk 53 and a support disk 54.

The impeller shaft 51 has a cap 55 formed on the lower end thereof which is larger in diameter than a centrally disposed aperture 56 formed in the magnet 52. The shaft 51 has a central portion 57 which passes through the aperture 56 and the magnet 52 is retained on the shaft 51 by and abuts the cap 55. The central portion 57 of the shaft 51 also passes through a centrally disposed aperture 58 formed the impeller disk 53. A lower surface (not shown) of the disk 53 abuts an upper surface 59 of the disk magnet 52 and both disks are retained on the shaft by the cap 55. The upper surface 59 of the magnet 52 and the lower surface (not shown) of the impeller disk 53 are attached together with a suitable adhesive (not shown). The apertures 56 and 58 are slightly larger in diameter than the central portion 57 such that the disk magnet 52 and the impeller disk 53 are free to rotate together on the shaft 51.

The shaft 51 has a reduced diameter portion 60 formed at the end opposite the cap 55. The reduced diameter portion 60 extends through a centrally disposed aperture 61 formed in a central hub 62 of the support disk 54. The disk 54 also includes a ring 63 having a centrally disposed aperture 64 formed therein. The hub 62 is supported approximately at the center of the aperture 64 by three generally equally spaced arms 65 connected between a side of the hub and an upper surface 66 of the ring 63. The lower surface (not shown) of the hub 62 is supported on a step formed at the juncture of the central portion 57 and the reduced diameter portion 60 of the shaft 51. The upper end of the portion 60 can be headed over onto an upper surface 67 of the hub 62 to retain the support disk 63 on the shaft 51.

As shown in FIG. 2, the lower surface of the ring 63 abuts the upper surface of the wall 21 to support the impeller assembly in the aperture 46. The support disk 54 is positioned in the space between the upper wall 21 and the support plate 37 at the bottom of the filter cavity 34. The disk magnet 52 and the impeller disk 53 are suspended on the downwardly extending shaft 57 in the space between the upper wall 21 and the tank bottom 11. A plurality of upstanding fins 68 are formed on an upper surface 69 of the impeller disk 53 and are positioned adjacent the aperture 46. A manifold chamber 70 is defined by downwardly extending end walls 71 and side wall 72 attached to the wall 21, the support wall (now shown) adjacent the side wall 13 of the tank 10, the upper wall 21 and the tank bottom 11. A plurality of apertures 73, shown as being slot shaped, are formed in the bottom of the walls 71 and 72 for water flow from the manifold chamber 70 to the dispersion chamber 24.

A motor enclosure 80 is attached to the lower surface of the tank bottom 11 by any suitable means. An electric motor 81 is mounted in the enclosure and has an output shaft 82 to which a disk magnet 83 is attached. As the motor 81 rotates the magnet 83, the magnet 52 and the impeller disk 53 are rotated about the shaft 51 in response to the magnetic attraction between the magnets 52 and 83. The lower side of the ring 63 and the upper side of the upper wall 21 adjacent the aperture 46 can be formed with rough surfaces to prevent slippage of the support disk 54 as the magnet 52 and the impeller disk 53 are rotated.

As the impeller disk 53 is rotated, the upstanding fins 68 create a low pressure area which draws water from the upper portion of the tank 10 through the slots 44 formed in the cover plate 42 and into the filter cavity 34. The water is drawn through the filter material 43, through the slots 45 formed in the support plate 37, and down through the aperture 46 into the manifold chamber 70. The flow of water into the chamber 70 forces water already in the chamber out through the apertures 73 and into the dispersion chamber 24. The flow of water into the chamber 24 forces water already in the chamber out through the slots 25 and the slots 26 and into the upper portion of the tank 10. The manifold chamber functions to more evenly distribute the water to the dispersion chamber and to improve the efficiency of the bypass cavity by increasing the pressure at the inlet to the bypass cavity.

Figure 5:
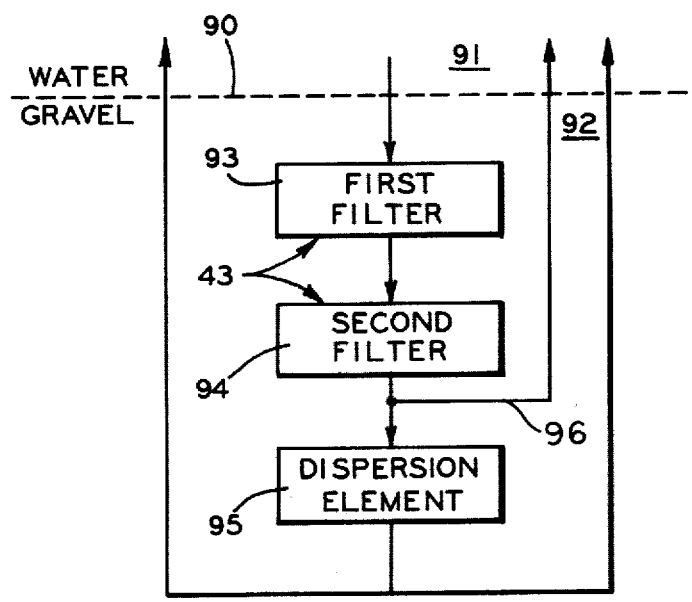
FIG. 5 is a schematic block diagram of the water flow path through the filter according to the present invention.

There is shown in FIG. 5 a schematic block diagram of the water flow through the filter and dispersion element of the present invention. A dashed line 90 represents the interface between water 91 in the upper portion of the tank and gravel 92 which typically is utilized to cover the filter assembly 20 to hide it from view. The water 91 is drawn from the upper portion of the tank through the gravel 92 covering the cover plate 42 and down through the filter material 43. The filter material includes a first filter 93 and a second filter 94 which are the mechanical-chemical filters discussed above. The filtered water is then drawn into a dispersion element 95 from where it flows back to the upper portion of the tank through the gravel 92. A portion 96 of the water can bypass the dispersion chamber through the bypass cavity 35. The slot pattern formed in the upper wall 21 provides a substantially uniform flow of filtered water to all areas of the upper portion of the tank as the water exits the gravel 92. The constant movement of water and dissolved oxygen through the gravel provides oxygen to that area which promotes the presence of aerobic bacteria which live on the organic droppings and other materials. Thus, the slotted surface of the upper wall 21 and the gravel resting thereon functions as a biological filter.

The flow of water through the dispersion chamber 24 can be adjusted by utilizing the bypass cavity 35. The portion of the upper wall 21 defining the bottom of the cavity 35 can have the slots 26 formed therein or be completely open for fluid flow from the manifold chamber 70 to the bypass cavity 35. The top of the bypass cavity 35 is closed by a cover 100 which is attached to the upper edge of the central wall 33 by any suitable hinge means (not shown). Attached to the cover 100 along the edge opposite the hinged edge is a downwardly extending arcuate screen wall 101. Downwardly extending side walls 102 (only one is shown) are attached to the cover 100 to block the top of the bypass cavity 35 when the cover is in the raised position shown in phantom. Although not shown, the screen wall 101 has a plurality of apertures formed therein to allow water to flow into the cavity. However, the apertures are sized to prevent any gravel from entering the cavity 35.

The pressure created by the rotation of the fins 68 forces water from the manifold chamber 70 through the cavity 35. Such flow is in parallel with the flow through the dispersion chamber 24. If the impeller assembly 50 is rotated at a constant speed, the flow of water through the dispersion chamber 24 can be regulated by adjusting the angle at which the cover is opened. The larger the angle, the more water that will bypass the dispersion chamber. Thus, the filter according to the present invention has means for selectively adjusting the flow rate through the biological filter.

The filter assembly 20 can be placed in the tank 10 with the filter box 30 adjacent either the wall 12 or the wall 13. Then the entire filter assembly can be covered with gravel in which plants are planted and on which stones or other objects can be placed. Thus, there are no boxes hanging on the sides of the tank or tubes extending through the gravel to block the view and detract from the scene in the tank. When it is time to change the filter material 43, the gravel can be brushed from the filter box 39 and the box removed for easy access to the filter material.

Although the upper wall 21 has been shown as a slotted flat plate, it will be recognized that any shape of plate and apertures can be utilized to achieve uniform flow through the gravel. Similarly, the shape and position of the filter box 30 and pump means can be changed without altering the water flow path shown in FIG. 5.

Figure 6:
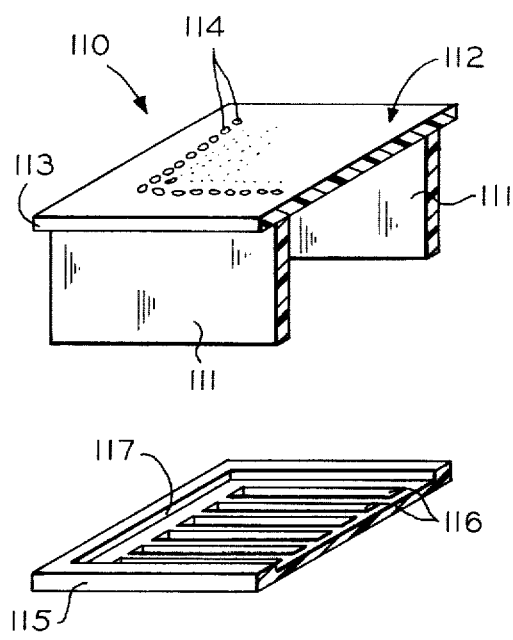
FIG. 6 is a fragmentary perspective view of a first alternate embodiment of the filter box shown in FIGS. 1–3.

In FIG. 6 there is shown an alternate embodiment of the filter box 39 shown in FIGS. 1 through 3. A filter box 110 is shown in a fragmentary perspective view as being formed with four vertically extending sides 111 (two are not shown) which abut the inside surfaces of the walls of the filter cavity 34. A horizontally extending upper cover 112 is attached to the upper ends of the walls 111 and defines a horizontally extending flauge 113. The flauge supports the box 110 on the upper ends of the filter box retainer walls 31 and 32. The upper cover 112 has a plurality of apertures 114 formed therein which are shown as circular aperatures but could be of any suitable shape. A removable bottom cover 115 has a plurality of aperatures 116 formed therein which are shown as slots but could be of any suitable shape. The bottom cover 115 has an upstanding lip 117 formed adjacent the periphery thereof for engaging the inner surfaces of the walls 111 in an interference fit. Thus, the bottom cover snaps onto the open bottom of the box 110 to retain filter material (not shown).

Figure 7:
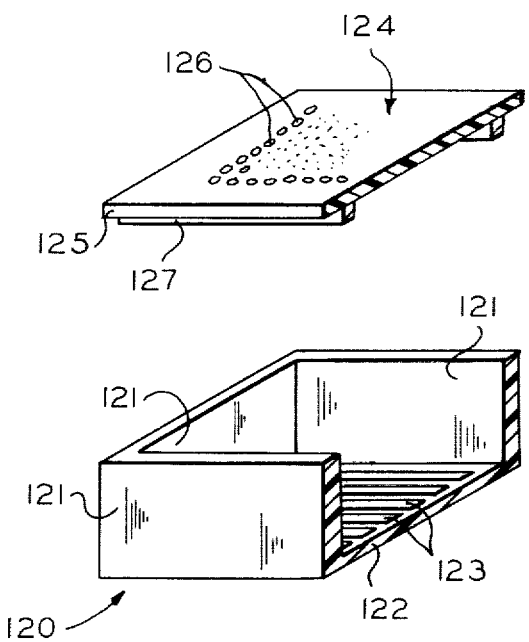
FIG. 7 is a fragmentary perspective view of a second alternate embodiment of the filter box shown in FIGS. 1–3.

A second alternate embodiment of the filter box is shown in FIG. 7. A filter box 20 is shown in a fragmentary perspective view as being formed with four vertically extending walls 121 (only three are shown) which abut the inside surfaces of the walls of the filter cavity 34. A horizontally extending lower cover 122 is attached to the lower ends of the walls 121. The lower cover has a plurality of aperatures 123 formed therein which are shown as slots but could be of any suitable shape. A removable upper cover 124 defines a horizontally extending flauge 125 which extends beyond the walls 121 and supports the box 120 on the upper ends of the filter box retainer walls 31 and 32. The upper cover has a plurality of aperatures 126 formed therein which are shown as circular aperatures but could be of any suitable shape. The upper cover 124 also has a downwardly extending lip 127 formed thereon adjacent the periphery thereof for engaging the minor surfaces of the walls 121 in an interference fit. Thus, the upper cover 124 snaps onto the open upper end of the box 120 to retain the filter material (not shown). It is to be understood that any suitable means for releasably attaching the bottom cover 115 to the box 110 or the upper cover 124 to the box 120 could be utilized.

Figure 8:
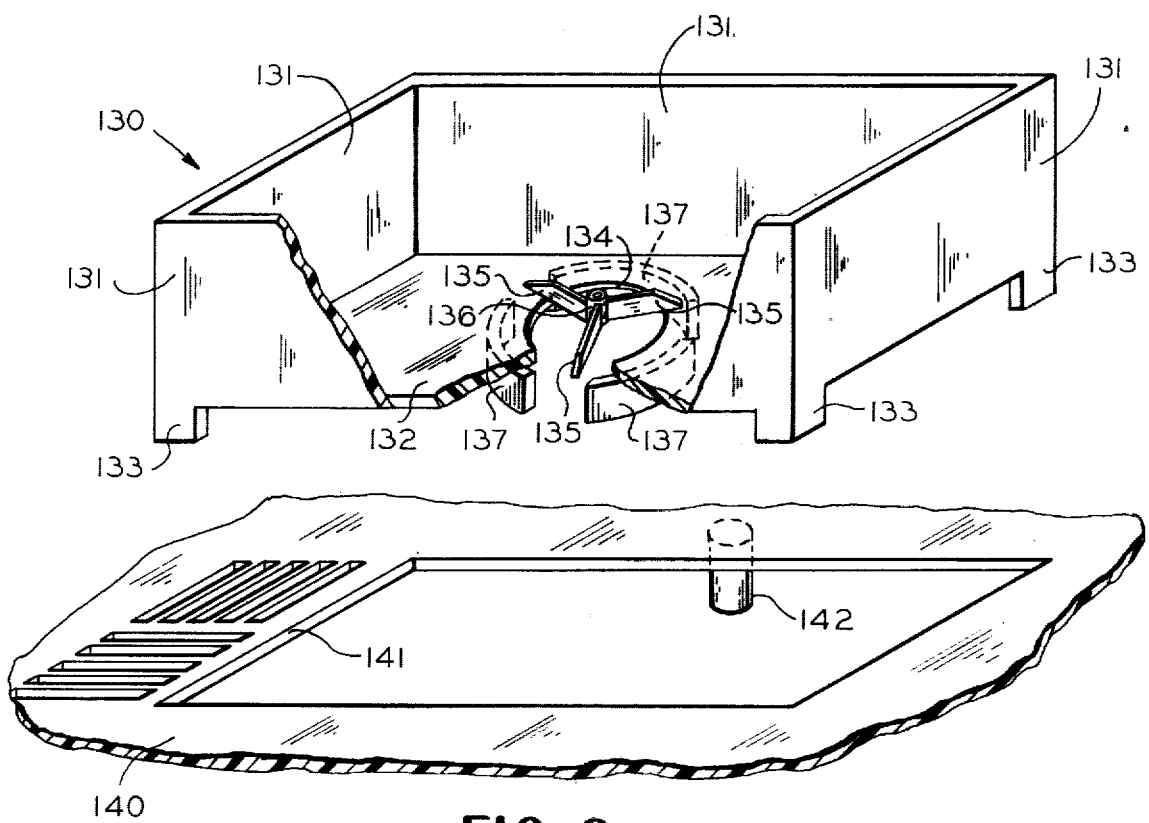
FIG. 8 is a fragmentary perspective view of an alternate embodiment of the filter box retainer shown in FIG. 2.

There is shown in FIG. 8 an alternate embodiment of the filter box retainer 30 shown in FIG. 2. A filter box retainer 130 is defined by four upstanding walls 131 attached to a horizontally extending bottom plate 132 to form a box open at the top. A foot 133 is formed at each lower corner of the filter box retainer 130 to support the retainer on the bottom wall of the aquarium. The retainer 130 can receive and support any of the filter boxes 39, 110 and 120 shown in FIGS. 2, 6, and 7 respectively.

The bottom plate 132 has a circular aperture 134 formed generally at the center thereof. Attached to the bottom plate 134 are three generally equally spaced arms 135 which extend over the aperture 134 to support a hub 136 which is similar to the hub 62 shown in FIG. 4 and is adapted to receive the impeller shaft 51. Attached to the bottom surface of the plate 132 are three arcuate walls 137 which are generally equally spaced apart about the aperture 134. The walls 137 are the same height as the feet 133 such that they rest on the bottom wall of the aquarium. Thus, the walls 137 provide additional support for the plate 132 and form a manifold chamber from which the water is forced by the pump into the dispersion chamber.

Also shown in FIG. 8 is an alternate embodiment of the substratum shown in FIGS. 1 through 3. The substratum has a horizontally disposed upper wall 140, similar to the upper wall 21, which is supported above the upper surface of the bottom wall of the aquarium by support walls (now shown) similar to the support walls 22 and 23. The upper wall 140, the support walls and the bottom wall of the aquarium form a dispersion chamber from which filtered water is dispersed. The upper wall 140 has a generally rectangular aperture 141 formed therein for receiving the filter box retainer 130. The retainer 130 is dimensioned to abut the periphery of the aperture with the outside surfaces of the walls 131 to prevent water from flowing between the upper wall 140 and the retainer 130. A foot 142 can be attached to the lower surface of the plate 140 to provide support by engaging the bottom wall of the aquarium.

In summary, the present invention concerns an apparatus for filtering fluid in an aquarium having a bottom and side walls. The filter apparatus comprises a substratum supported on an upper side of the tank bottom and cooperating with the tank bottom to define a dispersion chamber, the upper wall of the substratum having a plurality of apertures formed therein; a filter means defining a filter cavity for retaining a filter materia, the filter cavity having an inlet in fluid communication with the fluid in the tank and an outlet in fluid communication with the dispersion chamber; and pump means for circulating the fluid in the tank through the filter material in the filter cavity and the dispersion chamber.

The filter means includes a filter box retainer having generally upstanding side walls defining the filter cavity for retaining filter material. The filter apparatus also includes a plurality of walls cooperating with the substratum, the tank bottom and the filter means to define a manifold chamber connected in fluid communication between the filter cavity and the dispersion chamber. The filter apparatus can also include a bypass cavity for diverting a portion of the fluid flow through the filter cavity away from the dispersion chamber.

In accordance with the provisions of the patent statutes, the principle and mode of operation of the invention have been described and illustrated in its preferred embodiment. However, it must be understood that the invention can be practiced otherwise than as specifically illustrated and described without departing from its spirit or scope.

What is claimed is:

1. In an aquarium tank having a bottom and side walls for retaining a body of liquid, a fluid filter apparatus comprising:
   means for supporting gravel in the tank including a horizontal perforated plate extending between the side walls of the tank and spaced above the bottom thereof defining a fluid dispersion chamber;
   a receptacle for containing filter material located on an upper side of said horizontal perforated plate and constructed and arranged to permit fluid flow through a plurality of apertures in said perforated plate spaced from side walls of said receptacle, said receptacle including a perforated cover plate and a perforated bottom plate spaced between said side walls of said receptacle; and
   pump means including impeller means and magnetic means rotatably supported in said dispersion chamber and motor means located beneath the bottom of the tank for operatively rotating by magnetic coupling said impeller means whereby fluid from the tank is drawn through said filter material receptacle into said dispersion chamber and is discharged back into the tank through said plurality of apertures in said horizontal perforated plate spaced from said side walls of said receptacle.

2. The apparatus according to claim 1 wherein said perforated plate includes a generally horizontally extending upper wall abutting the inwardly facing surfaces of the tank sides, and supporting walls attached to said upper wall and extending downwardly to support said upper wall on the tank bottom, said upper wall and said supporting walls cooperating with the tank bottom to define said dispersion chamber.

3. The apparatus according to claim 2 wherein said apertures includes slots formed in said upper wall.

4. The apparatus according to claim 2 wherein said apertures include slots formed in said supporting walls.

5. The apparatus according to claim 1 wherein said filter material receptacle includes a filter box retainer having generally upstanding side walls attached to an upper surface of said perforated plate, and said perforated cover plate is a removable cover supported on upper edges of said side walls, said side walls and said cover cooperating with said perforated plate to define said filter material receptacle.

6. The apparatus according to claim 1 wherein said filter material receptacle defines a bypass cavity having an outlet in fluid communication with the portion of the tank above said perforated plate and an inlet in fluid communication with said dispersion chamber.

7. The apparatus according to claim 6 including means for selectively varying the area of said fluid outlet of said bypass cavity.

8. The apparatus according to claim 1 wherein said filter material receptacle includes a filter box retainer having generally upstanding side walls attached to a bottom plate, and said perforated cover plate is a removable cover supported on upper edges of said side walls, said side walls and said bottom plate cooperating with said cover to define said filter material receptacle, said side walls extending through an aperture in said perforated plate and supported on said upper side of the tank bottom.

9. The apparatus according to claim 1 wherein said filter material receptacle includes a filter box for retaining said filter material, said filter box being removably received in said filter material receptacle and having an inlet and an outlet for the circulation of fluid through said filter material.

* * * * *